(12) United States Patent
Ozawa et al.

(10) Patent No.: US 10,800,912 B2
(45) Date of Patent: Oct. 13, 2020

(54) RESIN FILM

(71) Applicant: KURARAY CO., LTD., Kurashiki-shi (JP)

(72) Inventors: Hiroshi Ozawa, Tainai (JP); Yasuhito Kitade, Tainai (JP)

(73) Assignee: KURARAY CO., LTD., Kurashiki-shi (JP)

(*) Notice: Subject to any disclaimer, the term of this patent is extended or adjusted under 35 U.S.C. 154(b) by 168 days.

(21) Appl. No.: 16/066,853

(22) PCT Filed: Dec. 27, 2016

(86) PCT No.: PCT/JP2016/088907
§ 371 (c)(1),
(2) Date: Jun. 28, 2018

(87) PCT Pub. No.: WO2017/115800
PCT Pub. Date: Jul. 6, 2017

(65) Prior Publication Data
US 2019/0016878 A1 Jan. 17, 2019

(30) Foreign Application Priority Data

Dec. 28, 2015 (JP) .................. 2015-256002

(51) Int. Cl.
*B32B 27/30* (2006.01)
*C08L 33/08* (2006.01)
*C08L 33/10* (2006.01)
*C08L 33/12* (2006.01)
*C08J 5/18* (2006.01)
*C08L 33/06* (2006.01)
*C08L 101/00* (2006.01)
*B29C 45/00* (2006.01)
*B29K 433/04* (2006.01)
*B29L 7/00* (2006.01)

(52) U.S. Cl.
CPC .......... *C08L 33/12* (2013.01); *B29C 45/0001* (2013.01); *B32B 27/30* (2013.01); *C08J 5/18* (2013.01); *C08L 33/06* (2013.01); *C08L 101/00* (2013.01); *B29K 2433/12* (2013.01); *B29L 2007/008* (2013.01); *C08J 2333/12* (2013.01); *C08J 2433/08* (2013.01); *C08J 2433/12* (2013.01)

(58) Field of Classification Search
None
See application file for complete search history.

(56) References Cited

U.S. PATENT DOCUMENTS

| 3,793,402 A * | 2/1974 | Owens ................ C08F 285/00 525/81 |
| 2008/0262156 A1* | 10/2008 | Banyay ................ B32B 21/04 525/71 |
| 2008/0269413 A1* | 10/2008 | Nagasaka ............ C08F 285/00 525/85 |

FOREIGN PATENT DOCUMENTS

| JP | 04-270751 A | 9/1992 |
| JP | 06-228404 A | 8/1994 |
| JP | 06-228405 A | 8/1994 |
| JP | 11-071437 A | 3/1999 |
| JP | 2004-352837 A | 12/2004 |
| JP | 2005-306980 A | 11/2005 |
| JP | 2007204620 A * | 8/2007 ............ B32B 27/30 |
| JP | 2011-6647 A | 1/2011 |
| JP | 2012-180454 A | 9/2012 |

OTHER PUBLICATIONS

Machine translation of JP-2007204620-A (no date).*
Machine translation of JP-2011006647-A (no date).*
International Search Report dated Apr. 11, 2017 in PCT/2016/088907, filed on Dec. 27, 2016.

* cited by examiner

Primary Examiner — Michael J Feely
(74) Attorney, Agent, or Firm — Oblon, McClelland, Maier & Neustadt, L.L.P.

(57) ABSTRACT

A resin film comprising a resin (A) and a multi-layered particle (B), the multi-layered particle comprising a layer (a) made of a polymer comprising 80 to 99.99% by mass of a methyl methacrylate unit, 0.01 to 2% by mass of a crosslinkable monomer unit and 0 to 19.99% by mass of additional copolymerizable monomer units, a layer (b) made of a polymer comprising 70 to 99.8% by mass of an alkyl acrylate unit, 0.2 to 10% by mass of a crosslinkable monomer unit and 0 to 29.8% by mass of additional copolymerizable monomer units, and a layer (c) made of a polymer comprising 80 to 100% by mass of a methyl methacrylate unit and 0 to 20% by mass of additional copolymerizable monomer units, wherein an amount of the layer (a) is 5 to 15 parts by mass, an amount of the layer (b) is 40 to 60 parts by mass and an amount of the layer (c) is 35 to 50 parts by mass, based on 100 parts by mass of the total amount of the layer (a), the layer (b) and the layer (c), and the layer (a), the layer (b) and the layer (c) are arranged in this order from the center of the particle toward the outer surface of the particle, and a volume-based average particle diameter is 90 to 150 nm.

11 Claims, No Drawings

RESIN FILM

TECHNICAL FIELD

The present invention relates to a resin film. More particularly, the present invention relates to a resin film having high heat resistance and surface hardness and suppressed whitening due to bending.

BACKGROUND ART

There has been known a molded article of a resin composition comprising a thermoplastic resin such as an acrylic resin and a multi-layered structure polymer particle.

For example, Patent Document 1 discloses a molded article made of a resin composition comprising an acrylic resin; a multi-layered structure polymer particle and a particle for dispersion; the multi-layered structure polymer particle having at least one structure comprising at least three layers composed of 10 to 65% by mass of a layer (crosslinked resin layer) comprising a copolymer comprising 80 to 99.99% by mass of methyl methacrylate, 0.01 to 5% by mass of a crosslinkable monomer and 19.99 to 0% by mass of other mono-functional monomers, 5 to 75% by mass of a layer (crosslinked elastic layer) comprising a copolymer comprising 70 to 99.8% by mass of an alkyl acrylate, 0.2 to 20% by mass of a crosslinkable monomer and 29.8 to 0% by mass of other mono-functional monomers, and 5 to 30% by mass of a layer (rigid thermoplastic resin layer) comprising a polymer comprising not less than 80% by mass of methyl methacrylate and not more than 20% by mass of other mono-functional monomers, the crosslinked resin layer, the crosslinked elastic layer and the rigid thermoplastic resin layer being arranged in this order from a center layer to an outermost layer direction. The molded article is excellent in impact resistance, heat resistance, surface hardness and the like.

Patent Document 2 discloses a molded article made of a resin composition comprising a methacrylic thermoplastic polymer; a three-layered polymer particle and a particle for dispersion; the three-layered polymer particle composed of a core which is a layer made of a polymer (III) obtained by polymerizing 80 to 99.95% by mass of methyl methacrylate, 0 to 19.95% by mass of an alkyl acrylate ester monomer which has an alkyl group having 1 to 8 carbon atoms and 0.05 to 2% by mass of a crosslinkable monomer, an inner shell which is a layer made of a crosslinked elastic polymer (I) obtained by polymerizing 80 to 98% by mass of an alkyl acrylate ester monomer which has an alkyl group having 1 to 8 carbon atoms, 1 to 19% by mass of an aromatic vinyl monomer and 1 to 5% by mass of a crosslinkable monomer, and an outer shell which is a layer made of a thermoplastic polymer (II) obtained by polymerizing 80 to 100% by mass of methyl methacrylate and 0 to 20% by mass of an alkyl acrylate ester monomer which has an alkyl group having 1 to 8 carbon atoms, a ratio of the total mass of the core and the inner shell to the mass of the outer shell being preferably 60/40 to 95/5. The molded article has excellent impact resistance.

Patent Document 3 discloses an acrylic resin film having a thickness of 75 to 600 µm, made of a resin composition comprising a mother phase composed of an alkyl methacrylate based methacrylic resin; and a three-layered structure acrylic rubber particle; the three-layered structure acrylic rubber particle composed of a core made of a rigid polymer composed mainly of an alkyl methacrylate, an inner shell made of an elastic copolymer composed mainly of an alkyl acrylate and an outer shell made of a rigid polymer composed mainly of an alkyl methacrylate, a mass ratio of core/inner shell/outer shell being 30 to 40/40 to 50/10 to 30, a volume average particle diameter being 0.1 to 0.17 µm, the amount of the three-layered structure acrylic rubber particle (B) being 15 to 50% by mass. Patent Document 3 describes that the film hardly becomes clouded even when heated and can maintain high designability.

CITATION LIST

Patent Literatures

Patent Document 1: JP 2004-352837 A
Patent Document 2: JP 2012-180454 A
Patent Document 3: JP 2005-306980 A

SUMMARY OF THE INVENTION

Problems to be Solved by the Invention

The molded articles described in the above patent documents have excellent impact resistance but are insufficient in that they have low heat resistance and are easily whitened by bending and easily scratched by rubbing.

An object of the present invention is to provide a resin film which has high heat resistance and surface hardness and is hardly whitened by bending.

Means for Solving the Problems

Intensive studies for solving the above problems results in completing the present invention including the following embodiments.

[1] A resin film comprising a resin (A) and a multi-layered particle (B), the multi-layered particle (B) comprising a layer (a) made of a polymer comprising 80 to 99.99% by mass of a methyl methacrylate unit, 0.01 to 2% by mass of a crosslinkable monomer unit and 0 to 19.99% by mass of additional copolymerizable monomer units, a layer (b) made of a polymer comprising 70 to 99.8% by mass of an alkyl acrylate unit, 0.2 to 10% by mass of a crosslinkable monomer unit and 0 to 29.8% by mass of additional copolymerizable monomer units, and a layer (c) made of a polymer comprising 80 to 100% by mass of a methyl methacrylate unit and 0 to 20% by mass of additional copolymerizable monomer units, wherein an amount of the layer (a) is 5 to 15 parts by mass, an amount of the layer (b) is 40 to 60 parts by mass, and an amount of the layer (c) is 35 to 50 parts by mass, based on 100 parts by mass of the total amount of the layer (a), the layer (b) and the layer (c), and the layer (a), the layer (b) and the layer (c) are arranged in this order from the center of the particle toward the outer surface of the particle, and a volume-based average particle diameter is 90 to 150 nm.

[2] The resin film according to the embodiment [1], wherein the resin (A) is a methacrylic resin (a1) comprising 80 to 100% by mass of methyl methacrylate and having a weight average molecular weight as measured by gel permeation chromatography of not less than 90,000 g/mol.

[3] The resin film according to the embodiment [1] or [2], further comprising a polymer (C) comprising 80 to 100% by mass of a methyl methacrylate unit and having a weight average molecular weight as measured by gel permeation chromatography of less than 90,000 g/mol at a mass ratio (C/B) of the polymer (C) to the multi-layered particle (B) of 20/80 to 55/45.

[4] The resin film according to any one of the embodiments [1] to [3], wherein a mass ratio (B/A) of the multi-layered particle (B) to the resin (A) is 1/99 to 99/1.

[5] A method for producing a resin film, which comprises going through the steps of:

polymerizing a monomer comprising 80 to 99.99% by mass of methyl methacrylate, 0.01 to 2% by mass of a crosslinkable monomer and 0 to 19.99% by mass of additional copolymerizable monomers to form a layer (a), polymerizing a monomer comprising 70 to 99.8% by mass of an alkyl acrylate, 0.2 to 10% by mass of a crosslinkable monomer and 0 to 29.8% by mass of additional copolymerizable monomers to forma layer (b), and polymerizing a monomer comprising 80 to 100% by mass of methyl methacrylate and 0 to 20% by mass of additional copolymerizable monomers to form a layer (c), in this order, to produce a multi-layered particle (B) wherein an amount of the layer (a) is 5 to 15 parts by mass, an amount of the layer (b) is 40 to 60 parts by mass, and an amount of the layer (c) is 35 to 50 parts by mass, based on 100 parts by mass of the total amount of the layer (a), the layer (b) and the layer (c), and a volume-based average particle diameter is 90 to 150 nm; kneading a mixture comprising the multi-layered particle (B) and a resin (A), and forming the kneaded mixture into a film.

[6] A laminate comprising a layer composed of the resin film according to any one of the embodiments [1] to [4].

Advantageous Effects of the Invention

The resin film of the present invention has high Vicat softening temperature and is excellent in heat resistance. The resin film of the present invention has a pencil hardness of 3 H or harder and is hardly scratched by scraping. Further, the resin film of the present invention is hardly whitened due to bending.

EMBODIMENTS FOR CARRYING OUT THE INVENTION

The resin film of the present invention comprises a multi-layered particle (B) and a resin (A).

The multi-layered particle (B) is a core-shell structure particle leastwise comprising a layer (a), a layer (b), and a layer (c).

The layer (a) of the multi-layered particle is composed of a polymer which indispensably comprises a unit derived from methyl methacrylate (sometimes referred to as methyl methacrylate unit) and a unit derived from a crosslinkable monomer (sometimes referred to as crosslinkable monomer unit), and optionally comprises a unit derived from additional monomers copolymerizable with methyl methacrylate and the crosslinkable monomer (sometimes referred to as monomer (a) unit).

The amount of the methyl methacrylate unit comprised in the polymer constituting the layer (a) is preferably 80 to 99.99% by mass, more preferably 85 to 99% by mass, and still more preferably 90 to 98% by mass, based on the mass of the polymer constituting the layer (a).

Examples of the crosslinkable monomer comprised in the polymer constituting the layer (a) can include polyfunctional (meth) acrylates such as ethylene glycol dimethacrylate, propylene glycol dimethacrylate, triethylene glycol dimethacrylate, butylene glycol dimethacrylate, hexanediol dimethacrylate, ethylene glycol diacrylate, propylene glycol diacrylate, triethylene glycol diacrylate, butylene glycol diacrylate, hexanediol diacrylate, pentaerythritol trimethacrylate, trimethylolpropane trimethacrylate, ditrimethylolpropane tetramethacrylate, pentaerythritol tetramethacrylate, dipentaerythritol hexamethacrylate, ethoxylated isocyanuric acid trimethacrylate, ethoxylated glycerin trimethacrylate, pentaerythritol triacrylate, trimethylolpropane triacrylate, ditrimethylolpropane tetraacrylate, pentaerythritol tetraacrylate, dipentaerythritol hexaacrylate, ethoxylated isocyanuric acid triacrylate, ethoxylated glycerin triacrylate and the like; crosslinkable (meth)allyl carboxylate esters such as allyl methacrylate, allyl acrylate, methallyl methacrylate, methallyl acrylate, allyl cinnamate, methallyl cinnamate, diallyl maleate, diallyl phthalate, diallyl terephthalate, diallyl isophthalate and the like; polyfunctional ethylenically unsaturated monomers such as divinylbenzene and the like. These crosslinkable monomers can be used alone or in combination of two or more.

The amount of the crosslinkable monomer unit comprised in the polymer constituting the layer (a) is preferably 0.01 to 2% by mass, more preferably 0.03 to 1.5% by mass, and still more preferably 0.05 to 1.0% by mass, based on the mass of the polymer constituting the layer (a).

Examples of additional monomer copolymerizable with methyl methacrylate and the crosslinkable monomer (sometimes referred to as monomer (a)) can include, but are not limited to, alkyl methacrylate esters excluding methyl methacrylate, such as ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate and the like; aryl methacrylate esters such as phenyl methacrylate and the like; aralkyl methacrylate esters such as benzyl methacrylate and the like; aryl acrylate esters such as phenyl acrylate and the like; aralkyl acrylate esters such as benzyl acrylate and the like; alkyl acrylates such as methyl acrylate, ethyl acrylate, n-propyl acrylate, isopropyl acrylate, n-butyl acrylate, isobutyl acrylate, pentyl acrylate, hexyl acrylate, octyl acrylate, 2-ethylhexyl acrylate, cyclohexyl acrylate, dodecyl acrylate, myristyl acrylate, palmityl acrylate, stearyl acrylate, behenyl acrylate and the like; aromatic vinyl monomers such as styrene, α-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl)styrene, halogenated styrene and the like; vinyl cyanide monomers such as acrylonitrile, methacrylonitrile and the like; acrylamide, methacrylamide; acrylic acid, methacrylic acid; conjugated diene monomers such as butadiene, isoprene and the like; maleimide monomers such as N-propylmaleimide, N-cyclohexylmaleimide, N-o-chlorophenyl maleimide and the like. The monomer (a) is preferably a non-crosslinkable monomer. These monomers can be used alone or in combination of two or more. From the viewpoint of an improvement in heat resistance, it is preferred to determine the type and the proportion of the monomer (a) so that a glass transition temperature of the non-crosslinked copolymer obtained by copolymerization of only the monomer (a) and methyl methacrylate preferably is not lower than 60° C., and more preferably not lower than 80° C. The glass transition temperature of the non-crosslinked copolymer obtained by copolymerization of only the monomer (a) and methyl methacrylate may be actually measured or may be estimated from data described in the polymer handbook.

The amount of the monomer (a) unit comprised in the polymer constituting the layer (a) is preferably 0 to 19.99% by mass, more preferably 0 to 15% by mass, and still more preferably 0 to 10% by mass, based on the mass of the polymer constituting the layer (a).

The mass of the layer (a) is not less than 5 parts by mass and not more than 15 parts by mass, and preferably not less than 7 parts by mass and not more than 13 parts by mass, based on 100 parts by mass of the total amount of the layer (a), the layer (b) and the layer (c). If the mass of the layer (a) is in the above range, the obtained resin film is excellent in heat resistance.

The layer (b) of the multi-layered particle is composed of a polymer which indispensably comprises a unit derived from an alkyl acrylate (sometimes referred to as alkyl acrylate unit) and a unit derived from a crosslinkable monomer (sometimes referred to as crosslinkable monomer unit) and optionally comprises a unit derived from additional monomers copolymerizable with the alkyl acrylate and the crosslinkable monomer (sometimes referred to as monomer (b) unit).

Examples of the alkyl acrylate can include methyl acrylate, ethyl acrylate, n-propyl acrylate, isopropyl acrylate, n-butyl acrylate, isobutyl acrylate, pentyl acrylate, hexyl acrylate, octyl acrylate, 2-ethylhexyl acrylate, cyclohexyl acrylate, dodecyl acrylate, myristyl acrylate, palmityl acrylate, stearyl acrylate, behenyl acrylate and the like. An alkyl group of the alkyl acrylate used in the polymer constituting the layer (b) preferably has 2 to 8 carbon atoms.

The amount of the alkyl acrylate unit comprised in the polymer constituting the layer (b) is preferably 70 to 99.8% by mass, more preferably 75 to 90% by mass, and still more preferably 78 to 86% by mass, based on the mass of the polymer constituting the layer (b).

Examples of the crosslinkable monomer comprised in the polymer constituting the layer (b) can include the same crosslinkable monomers as those exemplified as the crosslinkable monomer comprised in the polymer constituting the layer (a).

The amount of the crosslinkable monomer unit comprised in the polymer constituting the layer (b) is preferably 0.2 to 10% by mass, more preferably 0.5 to 8% by mass, and still more preferably 1 to 6% by mass, based on the mass of the polymer constituting the layer (b).

Examples of additional monomers copolymerizable with the alkyl acrylate and the crosslinkable monomer (sometimes referred to as monomer (b)) can include, but are not limited to, alkyl methacrylates such as methyl methacrylate, ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate and the like; aryl methacrylate esters such as phenyl methacrylate and the like; aralkyl methacrylate esters such as benzyl methacrylate and the like; aryl acrylate esters such as phenyl acrylate and the like; aralkyl acrylate esters such as benzyl acrylate and the like; aromatic vinyl monomers such as styrene, α-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl)styrene, halogenated styrene and the like; vinyl cyanide monomers such as acrylonitrile, methacrylonitrile and the like; acrylamide, methacrylamide; acrylic acid, methacrylic acid; conjugated diene monomers such as butadiene, isoprene and the like; maleimide monomers such as N-propylmaleimide, N-cyclohexylmaleimide, N-o-chlorophenylmaleimide and the like. The monomer (b) is preferably a non-crosslinkable monomer. These monomers can be used alone or in combination of two or more.

From the viewpoint of an improvement in heat resistance, it is preferred to set the type and the proportion of the monomer (b) so that a glass transition temperature of the non-crosslinked copolymer obtained by copolymerization of only the monomer (b) and the alkyl acrylate preferably is not higher than 0° C., and more preferably not higher than −5° C. The glass transition temperature of the non-crosslinked copolymer obtained by copolymerization of only the monomer (b) and the alkyl acrylate may be actually measured or may be estimated from data described in the polymer handbook.

The amount of the monomer (b) unit comprised in the polymer constituting the layer (b) is preferably 0 to 29.8% by mass, more preferably 0 to 25% by mass, and still more preferably 0 to 22% by mass, based on the mass of the polymer constituting the layer (b).

The mass of the layer (b) is not less than 40 parts by mass and not more than 60 parts by mass, and preferably not less than 45 parts by mass and not more than 55 parts by mass, based on 100 parts by mass of the total amount of the layer (a), the layer (b) and the layer (c). If the mass of the layer (b) is in the above range, the obtained resin film has high surface hardness and is difficult to be cracked.

The layer (c) of the multi-layered particle is composed of a polymer which indispensably comprises a unit derived from methyl methacrylate (sometimes referred to as methyl methacrylate unit) and optionally comprises a unit derived from a monomer copolymerizable with methyl methacrylate (sometimes referred to as monomer (c) unit).

The amount of the methyl methacrylate unit comprised in the polymer constituting the layer (c) is preferably 80 to 100% by mass, more preferably 85 to 100% by mass, and still more preferably 90 to 100% by mass, based on the mass of the polymer constituting the layer (c).

Examples of the monomer copolymerizable with methyl methacrylate (sometimes referred to as monomer (c)) can include the same monomers as those exemplified as the monomer comprised in the polymer constituting the layer (a).

The amount of the monomer (c) unit comprised in the polymer constituting the layer (c) is preferably 0 to 20% by mass, more preferably 0 to 15% by mass, and still more preferably 0 to 10% by mass, based on the mass of the polymer constituting the layer (c).

The mass of the layer (c) is not less than 35 parts by mass and not more than 50 parts by mass, and preferably more than 37 parts by mass and not more than 45 parts by mass, based on 100 parts by mass of the total amount of the layer (a), the layer (b) and the layer (c). If the mass of the layer (c) is in the above range, the obtained resin film has high surface hardness.

The layer (a), the layer (b) and the layer (c) are arranged in the order of the layer (a), the layer (b) and the layer (c) from the center of the particle toward the outer surface of the particle. As long as the layer (a), the layer (b) and the layer (c) are arranged in this order, at least one additional layer (d) may be arranged at at least one of inside the layer (a), between the layer (a) and the layer (b), and between the layer (b) and the layer (c). The layer (d) can be composed of any one of the same polymer as that constituting the layer (a), the same polymer as that constituting the layer (b), the same polymer as that constituting the layer (c), and a polymer other than those polymers, without departing from the spirit of the present invention. For example, four layers may be arranged in the order of the layer (d), the layer (a), the layer (b) and the layer (c) by arranging the layer (d) made of the same polymer as that constituting the layer (b) inside the layer (a), or four layers may be arranged in the order of the layer (a), the layer (d), the layer (b) and the layer (c) by arranging the layer (d) made of the same polymer as that constituting the layer (c) between the layer (a) and the layer (b). It is preferable that the multi-layered particle used in the present invention has a structure in which three layers are arranged in the order of the layer (a), the layer (b) and the layer (c).

The multi-layered particle (B) used in the present invention has a volume average particle diameter of 90 to 150 nm, preferably 93 to 140 nm, and more preferably 95 to 130 nm. The volume average particle diameter $D_v$ is an arithmetic mean ($D_v = s\Sigma(vd)/\Sigma(v)$) calculated based on the volume-based particle size distribution as measured by the light scattering light method. d is the representative value of the particle diameter section, and v is the volume percentage per particle diameter section. If the particle diameter of the multilayer particle is in the above range, resistance to whitening upon bending of the obtained resin film can be enhanced. It is preferable that the multi-layered particle (B) maintains a particle form in the resin film. The average particle diameter of the multi-layered particle (B) can be adjusted by, for example, changing the amount of an emulsifier when the multi-layered particle (B) is produced by an emulsion polymerization method mentioned below. It is also possible to finely adjust the average particle diameter by changing the amount of a polymerization initiator and the feeding speed of a monomer for obtaining a polymer constituting each layer.

The multi-layered particle (B) used in the present invention is not particularly limited by the production method thereof but is preferably a multi-layered particle obtained by the emulsion polymerization method. The multi-layered particle (B) used in the present invention can be obtained by, for example, the following emulsion polymerization method. First, a monomer for obtaining a polymer constituting the layer (a) is emulsion-polymerized to obtain a seed particle composed of the layer (a), and in the presence of the seed particle, a monomer for obtaining a polymer constituting the layer (b) is emulsion-polymerized thereby the layer (b) is coated on a surface of the seed particle to obtain a two-layered core-shell particle. In the presence of the two-layered core-shell particle, a monomer for obtaining a polymer constituting the layer (c) is emulsion-polymerized thereby the layer (c) is coated on a surface of the two-layered core-shell particle to obtain a multi-layered particle having a structure in which three layers are arranged in the order of the layer (a), the layer (b) and the layer (c). The monomers for obtaining the polymer constituting each layer may be in one lump fed to the reaction system or may be gradually fed to the reaction system.

Examples of the emulsifier used in the emulsion polymerization method can include anionic emulsifiers, for example, dialkyl sulfosuccinates such as sodium dioctyl sulfosuccinate, sodium dilauryl sulfosuccinate and the like, alkylbenzene sulfonates such as sodium dodecylbenzene sulfonate and the like, and alkyl sulfates such as sodium dodecyl sulfate and the like; nonionic emulsifiers, for example, polyoxyethylene alkyl ethers, polyoxyethylene nonylphenyl ethers and the like; nonionic/anionic emulsifiers, for example, polyoxyethylene nonylphenyl ether sulfates such as sodium polyoxyethylene nonylphenyl ether sulfate and the like, polyoxyethylene alkyl ether sulfates such as sodium polyoxyethylene alkyl ether sulfate and the like, and alkyl ether carboxylates such as sodium polyoxyethylene tridecyl ether acetate and the like. These emulsifiers may be used alone or in combination of two or more. The average repeating unit number of the ethylene oxide units in the exemplified compounds of the nonionic emulsifier and the nonionic/anionic emulsifier is preferably not more than 30, more preferably not more than 20, and still more preferably not more than 10, so as to prevent the foaming property of the emulsifier from being extremely enhanced.

For example, when sodium polyoxyethylene tridecyl ether acetate, which is a nonionic/anionic emulsifier, is used as the emulsifier so as to adjust the average particle diameter of the multi-layered particle (B) in the range defined in the present invention, the amount thereof is preferably 0.05 to 0.09 part by mass per 100 parts by mass of water. When sodium dodecyl diphenyl ether disulfonate, which is an anionic emulsifier, is used as the emulsifier, the amount thereof is preferably 0.25 to 0.45 part by mass per 100 parts by mass of water. The emulsifier may be added to the reaction system together with water or may be added together with a monomer for obtaining a polymer constituting each layer.

Examples of the polymerization initiator used in the emulsion polymerization method can include persulfate initiators such as potassium persulfate, ammonium persulfate and the like; and redox initiators such as persulfoxylate/organic peroxide, persulfate/sulfite and the like.

Examples of the chain transfer agent used in the emulsion polymerization method can include mercaptans such as n-octyl mercaptan, t-octyl mercaptan, n-dodecyl mercaptan, t-dodecyl mercaptan, mercaptoethanol and the like; terpenes such as terpinolene, dipentene, t-terpinene and the like; halogenated hydrocarbons such as chloroform, carbon tetrachloride and the like; α-methylstyrene dimer and the like. These chain transfer agents can be used alone or in combination of two or more. Of these, alkyl mercaptans such as n-octyl mercaptan are preferable. The amount of the chain transfer agent used is preferably 0.05 to 1.5 parts by mass based on 100 parts by mass of the monomer for obtaining the polymer constituting each layer.

A latex of the multi-layered particle is obtained by the emulsion polymerization method. The multi-layered particle can be optionally isolated from the latex. Isolation of the multi-layered particle can be performed by known methods such as a salting out coagulation method, a freeze coagulation method, a spray drying method and the like. Of these, the salting out coagulation method and the freeze coagulation method are preferable in view of the fact that impurities contained in the multi-layered particle can be easily removed by washing with water. To remove foreign substances mixed in the latex before the coagulation step, it is preferable to filter the latex through a wire gauze having an opening of not more than 50 μm.

In the production of a resin film, a particle for dispersion is preferably mixed with the resin (A) together with the multi-layered particle (B) so as to suppress agglomeration of the multi-layered particle (B) and to promote uniform dispersion in the resin (A). Examples of the particle for dispersion can include those mentioned in Patent Document 1, Patent Document 2 and the like.

The volume average particle diameter of the particle for dispersion is preferably 40 to 120 nm, and more preferably 50 to 100 nm. The volume average particle diameter of the particle for dispersion is preferably smaller than the volume average particle diameter of the multi-layered particle.

The particle for dispersion used in the present invention is not particularly limited by the production method thereof but is preferably a particle for dispersion obtained by an emulsion polymerization method.

Examples of the emulsifier, the polymerization initiator, and the chain transfer agent used in the emulsion polymerization method for producing particles for dispersion can include the same emulsifiers, polymerization initiators, and chain transfer agents as those exemplified as the emulsifier, the polymerization initiator, and the chain transfer agent used for the emulsion polymerization method for producing a multi-layered particle.

A latex of the particle for dispersion is obtained by an emulsion polymerization method. The particles for dispersion can be optionally isolated from the latex. Examples of the method for isolating the particle for dispersion can include the same methods as those exemplified as the method for isolating the multi-layered particle.

It is preferable to form the multi-layered particle (B) and the particle for dispersion into a mixed powder before kneading with the resin (A). The mixed powder of the multi-layered particle (B) and the particle for dispersion can be obtained, for example, by dry-mixing the isolated multi-layered particle and the isolated particle for dispersion or mixing the latex of the multi-layered particle and the latex of the particle for dispersion, followed by extraction from the mixed latex using known methods such as a salting out coagulation method, a freeze coagulation method and a spray drying method. It is preferable that the mixed powder is in a state where the particle for dispersion is coated on a surface of the multi-layered particle (B). The mixed powder in such a state can be efficiently obtained by mixing the latex of the multi-layered particle with the latex of the particle for dispersion, followed by extraction from the mixed latex by a known method.

The amount of the particle for dispersion is preferably 20 to 55% by mass, and more preferably 25 to 50% by mass, based on the mass of the mixed powder. The amount of the multi-layered particle is preferably 45 to 80% by mass, and more preferably 50 to 75% by mass, based on the mass of the mixed powder. A mass ratio of the multi-layered particle to the particle for dispersion is preferably 45:55 to 80:20.

From the viewpoint that the mixed powder of the multi-layered particle (B) and the particle for dispersion are easily dispersed uniformly during melt-kneading with the resin (A), plural multi-layered particles (B) and particles for dispersion preferably are flocculated to form a soft agglutinate. The volume average particle diameter of the soft agglutinate is preferably not more than 1,000 μm, and more preferably not more than 500 μm. The soft agglutinate may be in a state where the multi-layered particles are directly in contact with each other or the particle for dispersion is interposed between the multi-layered particles (B).

The mixed powder of the multi-layered particle (B) and the particle for dispersion has a bulk specific gravity of preferably 0.4 to 0.6 g/cm$^3$. The bulk specific gravity is a value as measured without tapping using a measuring cylinder. When the bulk specific gravity of the mixed powder is in the above range, the dispersibility of the multi-layered particle (B) in the resin (A) is improved.

The particle for dispersion, which may be used in the present invention, is preferably composed of a polymer (C).

The polymer (C) indispensably comprises a unit derived from methyl methacrylate (sometimes referred to as methyl methacrylate unit) and optionally comprises a unit derived from a monomer copolymerizable with methyl methacrylate (sometimes referred to as monomer (d) unit). The polymer (C) is preferably a non-crosslinked polymer.

The amount of the methyl methacrylate unit comprised in the polymer (C) constituting the particle for dispersion is preferably 80 to 100% by mass, and more preferably 85 to 100% by mass, based on the mass of the polymer (C).

Examples of the monomer copolymerizable with methyl methacrylate (sometimes referred to as monomer (d)) can include the same monomers as those exemplified as the monomer (a) which may be comprised in the polymer constituting the layer (a).

The amount of the monomer (d) unit comprised in the polymer (C) constituting the particle for dispersion is preferably 0 to 20% by mass, more preferably 0 to 18% by mass, and still more preferably 0 to 15% by mass, based on the mass of the polymer (C).

The weight average molecular weight as measured by gel permeation chromatography of the polymer (C) is preferably less than 90,000 g/mol, and more preferably 70,000 to 89,000 g/mol. The weight average molecular weight is a molecular weight in terms of standard polymethyl methacrylate. The weight average molecular weight of the polymer (C) can be adjusted by changing the type and the amount of the polymerization initiator and the chain transfer agent.

When the particle for dispersion composed of the polymer (C) is mixed with the resin (A) together with the multi-layered particle (B), the polymer (C) and the resin (A) are preferably compatible with each other to form no particle form in the resin film. The amount of the polymer (C) to be mixed as the particle for dispersion is preferably 20/80 to 55/45 in terms of a mass ratio (C/B) of the polymer (C) to the multi-layered particle (B).

The resin (A) used in the present invention is not particularly limited as long as it is a polymer or polymer composition capable of forming a film. Examples of the resin (A) can include polyolefin resins such as polyethylene, polypropylene, polybutene-1, poly-4-methylpentene-1, polynorbornene and the like; styrene-based resins such as polystyrene, a styrene-maleic anhydride copolymer, high impact polystyrene, AS resin, ABS resin, AES resin, AAS resin, ACS resin, MBS resin and the like; methacrylic resins such as a methyl methacrylate polymer, a methyl methacrylate-styrene copolymer and the like; polyester resins such as polyethylene terephthalate, polybutylene terephthalate and the like; polyamides such as nylon 6, nylon 66, a polyamide elastomer and the like; a polycarbonate resin, polyvinyl chloride, polyvinylidene chloride, polyvinyl alcohol, an ethylene-vinyl alcohol copolymer, polyacetal, polyvinylidene fluoride, polyurethane, modified polyphenylene ether, polyphenylene sulfide, a silicone-modified resin; acrylic rubber, silicone rubber; styrene-based thermoplastic elastomers such as SEPS, SEBS, SIS and the like; and olefin rubber such as IR, EPR, EPDM and the like. These resins can be used alone or in combination of two or more as long as they are capable of forming a film.

The resin (A) used preferably in the present invention is a methacrylic resin, and more preferably a methacrylic resin (a1) which comprises a unit derived from methyl methacrylate (sometimes referred to as methyl methacrylate unit) in the amount of 80 to 100% by mass, and preferably 85 to 100% by mass, based on the mass of the methacrylic resin (a1), and has a weight average molecular weight as measured by gel permeation chromatography of not less than 90,000 g/mol, and preferably 90,000 to 500,000 g/mol. The weight average molecular weight is a molecular weight in terms of standard polymethyl methacrylate.

The methacrylic resin (a1) may comprises a unit derived from a monomer other than methyl methacrylate (sometimes referred to as monomer (e) unit).

Examples of the monomer other than methyl methacrylate (sometimes referred to as monomer (e)) can include the same monomers as those exemplified as the monomer (a) which may be comprised in the polymer constituting the layer (a). The amount of the monomer (e) unit, which may be comprised in the methacrylic resin (a1), is preferably 0 to 20% by mass, and more preferably 0 to 15% by mass, based on the mass of the methacrylic resin (a1).

The method for producing a methacrylic resin (a1) used in the present invention is not particularly limited. For example, the methacrylic resin can be produced by known polymerization methods such as a radical polymerization method, an anionic polymerization method and the like. A methacrylic resin having desired characteristic values (e.g., weight average molecular weight, etc.) can be obtained by adjusting polymerization conditions, specifically, the polymerization temperature, the polymerization time, the type and the amount of the chain transfer agent, the type and the amount of the polymerization initiator and the like. Such adjustment of polymerization conditions is a technique commonly used by one skilled in the art.

In the production of the methacrylic resin (a1), when the radical polymerization method is used, it is possible to select a suspension polymerization method, a bulk polymerization method, a solution polymerization method, and an emulsion polymerization method. Of these polymerization methods, the suspension polymerization method or the bulk polymerization method is preferably used, from the viewpoint of the productivity and thermal decomposition resistance. The bulk polymerization method is preferably performed in a continuous flow system. The polymerization reaction is performed using a polymerization initiator, a predetermined monomer, and, if necessary, a chain transfer agent and the like.

The resin film according to the present invention may contain various additives such as antioxidants, thermal degradation inhibitors, ultraviolet absorbers, light stabilizers, lubricants, release agents, polymer processing aids, antistatic agents, flame retardants, dyes/pigments, light diffusing agents, organic pigments, delusterants and fluorescent materials, as long as the effects of the present invention are not impaired.

The antioxidant alone has the effect of preventing the oxidative deterioration of the resin in the presence of oxygen. Examples of the antioxidant can include phosphorus antioxidants, hindered phenol antioxidants, thioether antioxidants and the like. Of these, phosphorus antioxidants and hindered phenol antioxidants are preferable from the viewpoint of the effect of preventing deterioration of optical properties due to coloration, and combination use of phosphorus antioxidants and hindered phenol antioxidant is more preferable.

When phosphorus antioxidants and hindered phenol antioxidant are used in combination, a mass ratio of phosphorus antioxidants to hindered phenol antioxidants is preferably 0.2/1 to 2/1, and more preferably 0.5/1 to 1/1.

Examples of the phosphorus antioxidant can include 2,2-methylenebis(4,6-di-t-butylphenyl)octyl phosphite (trade name: ADK STAB HP-10, manufactured by ADEKA CORPORATION), tris(2,4-di-t-butylphenyl)phosphite (trade name: IRUGAFOS168, manufactured by BASF Corporation), 3,9-bis(2,6-di-t-butyl-4-methylphenoxy)-2,4,8,10-tetraoxa-3,9-diphosphaspiro[5.5]undecane (trade name: ADK STAB PEP-36, manufactured by ADEKA CORPORATION) and the like.

The hindered phenol antioxidant is preferably pentaerythrityl-tetrakis[3-(3,5-di-t-butyl-4-hydroxyphenyl)propionate] (trade name: IRGANOX 1010, manufactured by BASF Corporation), octadecyl-3-(3,5-di-t-butyl-4-hydroxyphenyl)propionate (trade name: IRGANOX 1076, manufactured by BASF Corporation) or the like.

The thermal deterioration inhibitor can prevent thermal deterioration of the resin by trapping polymer radicals generated when subjected to high temperature under substantially oxygen-free conditions.

The thermal deterioration inhibitor is preferably 2-t-butyl-6-(3'-t-butyl-5'-methyl-hydroxybenzyl)-4-methylphenyl acrylate (trade name: Sumilizer GM, manufactured by Sumitomo Chemical Co., Ltd.), 2,4-di-t-amyl-6-(3',5'-di-t-amyl-2'-hydroxy-α-methylbenzyl)phenyl acrylate (trade name: Sumilizer GS manufactured by Sumitomo Chemical Co., Ltd.) or the like.

The ultraviolet absorber is a compound having the ability to absorb ultraviolet rays and is said to have a function of mainly converting light energy into thermal energy.

Examples of the ultraviolet absorber can include benzophenones, benzotriazoles, triazines, benzoates, salicylates, cyanoacrylates, oxalic anilides, malonic esters, formamidines and the like. Of these, benzotriazoles, triazines, or ultraviolet absorbers having a maximum value $\varepsilon_{max}$ of a molar extinction coefficient at a wavelength of 380 to 450 nm of not more than 100 $dm^3 \cdot mol^{-1}$ $cm^{-1}$ are preferable.

Benzotriazoles have a high effect of suppressing deterioration of optical properties, such as coloration due to irradiation with ultraviolet rays and are therefore preferable as the ultraviolet absorber used when the resin film of the present invention is applied to optical applications. Benzotriazoles are preferably 2-(2H-benzotriazole-2-yl)-4-(1,1,3,3-tetramethylbutyl)phenol (trade name: TINUVIN 329, manufactured by BASF Corporation), 2-(2H-benzotriazole-2-yl)-4,6-bis(1-methyl-1-phenylethyl)phenol (trade name: TINUVIN 234, manufactured by BASF Corporation), 2,2'-methylenebis[6-(2H-benzotriazole-2-yl)-4-t-octylphenol] (LA-31, manufactured by ADEKA CORPORATION) and the like.

The ultraviolet absorber having a maximum value $\varepsilon_{max}$ of a molar extinction coefficient at a wavelength of 380 to 450 nm of not more than 1,200 $dm^3 \cdot mol^{-1}$ $cm^{-1}$ can suppress discoloration of the obtained resin film. Examples of the ultraviolet absorber can include 2-ethyl-2'-ethoxy-oxalanilide (trade name: Sandeyuboa VSU, manufactured by Clariant Japan K.K.) and the like.

Of these ultraviolet absorbers, benzotriazoles are preferably used from the viewpoint of being capable of suppressing deterioration of the resin due to irradiation with ultraviolet rays.

When it is desired to efficiently absorb light having a short wavelength of not more than 380 nm, triazine ultraviolet absorbers are preferably used. Examples of such ultraviolet absorbers can include 2,4,6-tris(2-hydroxy-4-hexyloxy-3-methylphenyl)-1,3,5-triazine (LA-F70, manufactured by ADEKA CORPORATION), hydroxyphenyltriazine ultraviolet absorbers (TINUVIN 477 and TINUVIN 460, manufactured by BASF Corporation), which are analogues thereof, and the like.

The maximum value $\varepsilon_{max}$ of the molar extinction coefficient of the ultraviolet absorber is measured as follows. To 1 L of cyclohexane, 10.00 mg of an ultraviolet absorber is added and dissolved so that the undissolved substance is not visually observed. This solution is poured into a quartz glass cell measuring 1 cm×1 cm×3 cm and an absorbance at a wavelength of 380 to 450 nm and an optical path length of 1 cm is measured using a U-3410 type spectrophotometer manufactured by Hitachi, Ltd. From the molecular weight ($M_{UV}$) of the ultraviolet absorber and the maximum value ($A_{max}$) of the measured absorbance, the maximum value $\varepsilon_{max}$ of the molar extinction coefficient is calculated by the following equation.

$$\varepsilon_{max} A_{max}/(10 \times 10^{-3})] \times M_{UV}$$

The light stabilizer is a compound which is said to have a function of trapping radicals generated mainly by oxidation due to light. As suitable light stabilizers, mentioned can be hindered amines such as compounds having a 2,2,6,6-tetraalkylpiperidine skeleton.

Examples of the lubricant include stearic acid, behenic acid, stearamide acid, methylene bisstearamide, hydroxystearic acid triglyceride, paraffin wax, ketone wax, octyl alcohol, hydrogenated oil and the like.

The release agent is a compound having a function of facilitating separation of a molded article from a mold. Examples of the release agent can include higher alcohols such as cetyl alcohol, stearyl alcohol and the like; and glycerin higher fatty acid esters such as stearic acid monoglyceride, stearic acid diglyceride and the like. In the present invention, it is preferable to use, as the release agent, higher alcohols and a glycerin fatty acid monoester in combination. When higher alcohols and the glycerin fatty acid monoester are used in combination, a mass ratio of higher alcohols/glycerin fatty acid monoester is preferably in a range of 2.5/1 to 3.5/1, and more preferably 2.8/1 to 3.2/1.

It is possible to use, as the polymer processing aid, a polymer particle having a particle diameter of 0.05 to 0.5 μm, which can be usually produced by an emulsion polymerization method. The polymer particle may be a single-layered particle made of a polymer having a single composition ratio and a single intrinsic viscosity, or a multi-layered particle made of two or more polymers having different composition ratios or intrinsic viscosities. Of these, preferred is a two-layered structure particle having a polymer layer having a low intrinsic viscosity in an inner layer and a polymer layer having a high intrinsic viscosity of not less than 5 dl/g in an outer layer. The polymer processing aid preferably has an average polymerization degree of 3,000 to 40,000 and an intrinsic viscosity of 3 to 6 dl/g. Specific examples thereof can include of METABLEN-P series manufactured by Mitsubishi Rayon Co., Ltd. and PARALOID series manufactured by The Dow Chemical Company. The amount of the polymer processing aid compounded in the resin film of the present invention is preferably not less than 0.1 part by mass and not more than 5 parts by mass based on 100 parts by mass of the resin (A). If the amount is not less than 0.1 part by mass, satisfactory processing properties are obtained and, if the amount is not more than 5 parts by mass, satisfactory surface smoothness is achieved.

It is possible to preferably used, as the organic pigment, a compound having a function of converting ultraviolet light, which is considered to be harmful to the resin, to visible light.

Examples of the light diffusing agent and delustering agent can include glass fine particles, polysiloxane crosslinked fine particles, crosslinked polymer fine particles, talc, calcium carbonate, barium sulfate and the like.

Examples of the fluorescent substance include fluorescent pigments, fluorescent dyes, fluorescent white dyes, fluorescent whitening agents, fluorescent bleaching agents and the like.

These additives may be used alone or in combination of two or more. These additives may be added when the resin (A) is produced, or may be added to the produced resin (A), or may be added when a resin compound for production of a film is prepared. The total amount of additives contained in the resin film of the present invention is preferably not more than 7% by mass, more preferably not more than 5% by mass, and still more preferably not more than 4% by mass, based on the resin (A) from the viewpoint of suppressing poor appearance of the film.

To produce the resin film of the present invention, a resin compound can be used. The resin compound for production of a film can be obtained, for example, by kneading the multi-layered particle (B) with the resin (A). It is preferable that the multi-layered particle (B) is mixed with the particle for dispersion to form a mixed powder, and then kneaded with the resin (A). Kneading can be performed using known mixing apparatuses or kneading apparatus, such as a kneader ruder, an extruder, a mixing roll, and a Banbury mixer. Of these, a twin-screw extruder is preferable. The temperature during mixing and kneading can be appropriately adjusted according to the melting temperature of the resin (A) to be used and is preferably 110° C. to 300° C.

The mass ratio {(A):(B)} of the resin (A) to the multi-layered particle (B) in the resin compound for production of a film and the resin film of the present invention is preferably 1:99 to 99:1, more preferably 10:90 to 50:50, and still more preferably 20:80 to 40:60.

The resin compound for production of a film can also be obtained by melt-kneading the resin (A), the multi-layered particle (B) or the mixed powder of the multi-layered particle (B) and the particle for dispersion in two or more stages. For example, a part of the resin (A) and the multi-layered particle (B) or the mixed powder of the multi-layered particle (B) and the particle for dispersion are melt-kneaded to obtain a master batch containing the multi-layered particle (B) in the amount larger than the target proportion, and then the master batch and the remainder of the resin (A) are melt-kneaded, thus making it possible to obtain a resin compound containing the multi-layered particles (B) at a desired proportion. According to the method through the master batch, the handleability of the multi-layered particle (B) is improved and the multi-layered particle (B) is easily dispersed uniformly in the resin (A).

The resin compound for production of a film has a melt flow rate as measured under the conditions of 230° C. and a load of 3.8 kg of preferably 0.1 to 6 g/10 min, more preferably 0.5 to 5 g/10 min, and most preferably 1.0 to 3 g/10 min.

The resin compound for production of a film has a haze at a thickness of 1.0 mm of preferably not more than 1.0%, more preferably not more than 0.7%, and still more preferably not more than 0.5%.

The above-mentioned resin compound for production of a film can be in any form such as pellets, granules, and powders.

The resin film according to the present invention is not particularly limited by the production method thereof. As the preferred production method, mentioned can be a method comprising mixing the multi-layered particle (B) and the particle for dispersion composed of the polymer (C) to obtain a mixed powder, kneading the mixed powder with the resin (A) to obtain a resin compound for a film, which contains the resin (A), the multi-layered particle (B) and the polymer (C), and then forming the resin compound for a film into a film.

Examples of the method for forming into a film can include a solution casting method, a melt casting method, an extrusion forming method, an inflation forming method, a blow forming method and the like. Of these, the extrusion forming method is preferable. According to the extrusion forming method, it is possible to obtain a resin film having excellent transparency, improved toughness, excellent handleability, and excellent balance among toughness, surface hardness, and rigidity. The temperature of the resin compound discharged from the extruder is set at preferably 160 to 280° C., and more preferably 220 to 270° C.

Of the extrusion forming methods, preferred is a method in which a resin compound for production of a film is extruded through a T-die in a molten state, and then the resin compound is formed while being sandwiched between two or more specular rolls or specular belts, from the viewpoint of obtaining a film having satisfactory surface smoothness, satisfactory specular gloss, and low haze. It is preferable that the specular roll or the specular belt is made of metal. The linear pressure between a pair of specular rollers or specular belts is preferably not less than 10 kg/cm, and more preferably not less than 30 kg/cm.

The surface temperature of the specular roll or specular belt is preferably not higher than 130° C. The surface temperature of at least one of the specular rolls or specular belts is preferably not lower than 60° C. If the surface temperature is set at noted above, it is possible to cool the resin compound discharged from the extruder at a speed faster than that of spontaneous standing cooling, and thus it is easy to produce the resin film of the present invention, which has excellent surface smoothness and low haze.

The resin film of the present invention may have been subjected to a stretching treatment in at least one direction. By the stretching treatment, the mechanical strength is increased, thus making it possible to obtain a film which is hardly cracked. Examples of the stretching method can include, but are not limited to, a uniaxial stretching method, a simultaneous biaxial stretching method, a sequential biaxial stretching method, a tubular stretching method and the like. The temperature during stretching is preferably 100 to 200° C., and more preferably 120° C. to 160° C., from the viewpoint that uniform stretching can be performed and a film having high strength can be obtained. Stretching is usually performed at 100 to 5,000%/min on a length basis. An area stretching ratio is preferably 1.5 to 8 times. After stretching, a film with less heat shrinkage can be obtained by heat-setting or relaxing the film.

The thickness of the resin film of the present invention is usually not less than 1 μm and not more than 200 μm, preferably not less than 10 μm and not more than 50 μm, and more preferably not less than 15 μm and not more than 40 μm.

A functional layer may be formed on a surface of the resin film of the present invention. Examples of the functional layer can include a gas barrier layer, a hard coat layer, an antiglare layer, an antireflection layer, a sticking prevention layer, a diffusion layer, an antiglare layer, an antistatic layer, an antifouling layer, an easily slidable layer composed of fine particles, an adhesive layer and the like. These layers can be formed by known methods such as a chemical vapor deposition method, a physical vapor deposition method, a coating method and the like.

The resin film of the present invention is characterized by high pencil hardness and high heat resistance, and can be used in various fields. For example, it is possible to use as a retardation film, a polarizer protective film, a liquid crystal protective plate, a surface material of a portable information terminal, a display window protective film of a portable information terminal, alight guiding film, a transparent conductive material coated with silver nanowires or carbon nanotubes, an antistatic film, front panel applications for various displays, an IR cut film, a security film, a scattering prevention film, a decorative film, a metal decorative film, a back sheet of a solar cell, a front sheet for a flexible solar cell, a shrink film, an in-mold label film, a gas barrier film and the like. Of these, the resin film can be suitably used as an interior material of automobiles and an exterior material of electric appliances.

The laminate of the present invention comprises a layer composed of the resin film of the present invention. The laminate of the present invention can be produced by pressing the resin film of the present invention against an article made of additional materials, by applying a solution of a resin compound for production of a film to an article made of additional materials, by coated melt molding of a resin compound for production of a film on an article made of additional materials, or by co-extruding a resin compound for production of a film and additional resin materials. The laminate of the present invention includes a laminate film as an embodiment thereof.

Examples of additional materials can include, but are not limited to, wooden materials, paper materials, cloth materials, metal materials, resin materials, ceramic materials and the like. Examples of additional resin materials can include polycarbonate polymers, vinyl chloride polymers, vinylidene fluoride polymers, methacrylic resins, ABS resins, AES resins, AS resins and the like. The form of additional materials is not limited to films, plates, rods, spheres, rectangular parallelepipeds and the like, and can be in various forms.

The present invention will be specifically described below by way of Examples, but the present invention is not limited by these Examples.

(Measurement of Particle Diameter)

Measurement was made using a laser diffraction/scattering particle size distribution analyzer LA-950V2 manufactured by Horiba, Ltd.

(Weight Average Molecular Weight: Mw)

The chromatogram was measured by gel permeation chromatography (GPC) under the following conditions, and the value converted into the molecular weight in terms of standard polymethyl methacrylate was calculated.

GPC apparatus: HLC-8320, manufactured by TOSOH CORPORATION

Detector: Differential refractive index detector Column: Two TSKgel SuperMultipore HZM-M and one SuperHZ 4000, manufactured by TOSOH CORPORATION, connected in series were used.

Eluent: Tetrahydrofuran

Eluent flow rate: 0.35 ml/min

Column temperature: 40° C.

(Heat Resistance)

Vicat softening temperature (VST) was measured in accordance with ISO-306-B50.

(Resistance to Whitening upon Bending)

A film having a thickness of 100 μm was bent at 90° at normal temperature (23° C.) and the bent portion was visually observed whether or not whitening occurs, and evaluation was performed by the following index.

◯: Whitening did not occur.

x: Whitening occurred.

(Surface Hardness)

A pencil hardness test was performed in accordance with JIS K 5400.

(Coextrusion Formability)

A methacrylic resin (PARAPET EH, manufactured by KURARAY Co., Ltd.) and the resin composition obtained in Examples or Comparative Examples were coextruded to produce a plate-shaped laminate composed of a 3 mm-thick layer made of the methacrylic resin and a 50 μm-thick layer made of the resin composition. The laminate was visually observed to examine whether or not flow mark and whitening at an interface occur, and evaluation was performed by the following index.

○: Neither flow mark nor whitening at an interface between layers occurred.

x: Flow mark or whitening at an interface between layers occurred.

[Production of Multi-Layered Particle (B-1)]

In a reactor equipped with a stirrer, a thermometer, a nitrogen gas introducing tube, a monomer introducing tube, and a reflux condenser, 150 parts by mass of deionized water, 0.10 part by mass of sodium polyoxyethylene tridecyl ether acetate, and 0.05 part by mass of sodium carbonate were charged and the atmosphere in the container was sufficiently purged with a nitrogen gas, leading to a substantially oxygen-free state, and then the inner temperature was set at 80° C. In the reactor, 0.01 part by mass of potassium persulfate was added, followed by stirring for 5 minutes. Thereafter, 10 parts by mass of a mixture of methyl methacrylate, methyl acrylate and allyl methacrylate at a mass ratio of 93.9/6.1/0.2 was continuously added dropwise over 50 minutes. After completion of the dropwise addition, the reaction was performed for about 30 minutes until the polymerization ratio reached not less than 98%.

Subsequently, 0.05 part by mass of potassium persulfate was charged in the reactor, followed by stirring for 5 minutes. Thereafter, 50 parts by mass of a mixture of n-butyl acrylate, styrene and allyl methacrylate at a mass ratio of 82.2/17.8/4.0 was continuously added dropwise over 90 minutes. After completion of the dropwise addition, the reaction was performed for about 60 minutes until the polymerization ratio reached not less than 98%.

Subsequently, 0.04 part by mass of potassium persulfate was charged in the reactor, followed by stirring for 5 minutes. Thereafter, 40 parts by mass of a mixture of methyl methacrylate, methyl acrylate and n-octyl mercaptan at a mass ratio of 94.0/6.0/0.3 was continuously added dropwise over 30 minutes. After completion of the dropwise addition, the reaction was performed for about 60 minutes until the polymerization ratio reached not less than 98% to obtain a latex containing a multi-layered particle (B-1) having a volume average particle diameter of 110 nm. Properties of the multi-layered particle (B-1) are collectively shown in Table 1.

[Production of Multi-Layered Particle (B-2)]

In a reactor equipped with a stirrer, a thermometer, a nitrogen gas introducing tube, a monomer introducing tube, and a reflux condenser, 150 parts by mass of deionized water, 0.11 part by mass of sodium polyoxyethylene tridecyl ether acetate, and 0.05 part by mass of sodium carbonate were charged and the atmosphere in the container was sufficiently purged with a nitrogen gas, leading to a substantially oxygen-free state, and then the inner temperature was set at 80° C. In the reactor, 0.012 part by mass of potassium persulfate was added, followed by stirring for 5 minutes. Thereafter, 12 parts by mass of a mixture of methyl methacrylate, methyl acrylate and allyl methacrylate at a mass ratio of 93.9/6.1/0.2 was continuously added dropwise over 50 minutes. After completion of the dropwise addition, the reaction was performed for about 30 minutes until the polymerization rate reached not less than 98%.

Subsequently, 0.053 part by mass of potassium persulfate was charged in the reactor, followed by stirring for 5 minutes. Thereafter, 53 parts by mass of a mixture of n-butyl acrylate, styrene and allyl methacrylate at a mass ratio of 82.2/17.8/4.0 was continuously added dropwise over 90 minutes. After completion of the dropwise addition, the reaction was performed for about 60 minutes until the polymerization ratio reached not less than 98%.

Subsequently, 0.038 part by mass of potassium persulfate was charged in the reactor, followed by stirring for 5 minutes. Thereafter, 38 parts by mass of a mixture of methyl methacrylate, methyl acrylate and n-octyl mercaptan at a mass ratio of 94.0/6.0/0.3 was continuously added dropwise over 30 minutes. After completion of the dropwise addition, the reaction was performed for about 60 minutes until the polymerization ratio reached not less than 98% to obtain a latex containing a multi-layered particle (B-2) having a volume average particle diameter of 100 nm. Properties of the multi-layered particle (B-2) are collectively shown in Table 1.

[Production of Multi-Layered Particle (B-3)]

In a reactor equipped with a stirrer, a thermometer, a nitrogen gas introducing tube, a monomer introducing tube, and a reflux condenser, 150 parts by mass of deionized water, 0.08 part by mass of sodium polyoxyethylene tridecyl ether acetate, and 0.05 part by mass of sodium carbonate were charged and the atmosphere in the container was sufficiently purged with a nitrogen gas, leading to a substantially oxygen-free state, and then the inner temperature was set at 80° C. In the reactor, 0.035 part by mass of potassium persulfate was added, followed by stirring for 5 minutes. Thereafter, 35 parts by mass of a mixture of methyl methacrylate, n-butyl acrylate, allyl methacrylate and n-octyl mercaptan at a mass ratio of 94.0/6.0/0.2/0.1 was continuously added dropwise over 50 minutes. After completion of the dropwise addition, the reaction was performed for about 30 minutes until the polymerization ratio reached not less than 98%.

Subsequently, 0.045 part by mass of potassium persulfate was charged in the reactor, followed by stirring for 5 minutes. Thereafter, 45 parts by mass of a mixture of n-butyl acrylate, styrene and allyl methacrylate at a mass ratio of 82.2/17.8/2.0 was continuously added dropwise over 90 minutes. After completion of the dropwise addition, the reaction was performed for about 60 minutes until the polymerization ratio reached not less than 98%.

Subsequently, 0.02 part by mass of potassium persulfate was charged in the reactor, followed by stirring for 5 minutes. Thereafter, 20 parts by mass of a mixture of methyl methacrylate, methyl acrylate and n-octyl mercaptan at a mass ratio of 94.0/6.0/0.2 was continuously added dropwise over 30 minutes. After completion of the dropwise addition, the reaction was performed for about 60 minutes until the polymerization ratio reached not less than 98% to obtain a latex containing a multi-layered particle (B-3) having a volume average particle diameter of 145 nm. Properties of the multi-layered particle (B-3) are collectively shown in Table 1.

[Production of Multi-Layered Particle (B-4)]

In a reactor equipped with a stirrer, a thermometer, a nitrogen gas introducing tube, a monomer introducing tube and a reflux condenser, 150 parts by mass of deionized water, 0.03 part by mass of sodium polyoxyethylene tridecyl ether acetate, and 0.05 part by mass of sodium carbonate were charged and the atmosphere in the container was sufficiently purged with a nitrogen gas, leading to a substantially oxygen-free state, and then the inner temperature was set at 80° C. In the reactor, 0.01 part by mass of potassium persulfate was added, followed by stirring for 5 minutes. Thereafter, 10 parts by mass of a mixture of methyl methacrylate, methyl acrylate and allyl methacrylate at a mass ratio of 93.9/6.1/0.2 was continuously added dropwise over 50 minutes. After completion of the dropwise addition, the reaction was performed for about 30 minutes until the polymerization ratio reached not less than 98%.

Subsequently, 0.05 part by mass of potassium persulfate was charged in the reactor, followed by stirring for 5 minutes. Thereafter, 50 parts by mass of a mixture of n-butyl acrylate, styrene and allyl methacrylate at a mass ratio of 82.2/17.8/4.0 was continuously added dropwise over 90 minutes. After completion of the dropwise addition, the reaction was performed for about 60 minutes until the polymerization ratio reached not less than 98%.

Subsequently, 0.04 part by mass of potassium persulfate was charged in the reactor, followed by stirring for 5 minutes. Thereafter, 40 parts by mass of a mixture of methyl methacrylate, methyl acrylate and n-octyl mercaptan at a mass ratio of 94.0/6.0/0.3 was continuously added dropwise over 30 minutes. After completion of the dropwise addition, the reaction was performed for about 60 minutes until the polymerization ratio reached not less than 98% to obtain a latex containing a multi-layered particle (B-4) having a volume average particle diameter of 220 nm. Properties of the multi-layered particle (B-4) are collectively shown in Table 1.

[Production of Multi-Layered Particle (B-5)]

In a reactor equipped with a stirrer, a thermometer, a nitrogen gas introducing tube, a monomer introducing tube, and a reflux condenser, 150 parts by mass of deionized water, 0.10 part by mass of sodium polyoxyethylene tridecyl ether acetate, and 0.05 part by mass of sodium carbonate were charged and the atmosphere in the container was sufficiently purged with a nitrogen gas, leading to a substantially oxygen-free state, and then the inner temperature was set at 80° C. In the reactor, 0.05 part by mass of potassium persulfate was added, followed by stirring for 5 minutes. Thereafter, 50 parts by mass of a mixture of n-butyl acrylate, styrene and allyl methacrylate at a mass ratio of 82.2/17.8/4.0 was continuously added dropwise over 90 minutes. After completion of the dropwise addition, the reaction was performed for about 60 minutes until the polymerization ratio reached not less than 98%.

Subsequently, 0.05 part by mass of potassium persulfate was charged in the reactor, followed by stirring for 5 minutes. Thereafter, 50 parts by mass of a mixture of methyl methacrylate, methyl acrylate and n-octyl mercaptan at a mass ratio of 94.0/6.0/0.3 was continuously added dropwise over 30 minutes. After completion of the dropwise addition, the reaction was performed for about 60 minutes until the polymerization ratio reached not less than 98% to obtain a latex containing a multi-layered particle (B-5) having a volume average particle diameter of 110 nm. Properties of the multi-layered particle (B-5) are collectively shown in Table 1.

[Production of Multi-Layered Particle (B-6)]

A latex containing a multi-layered particle (B-6) having a volume average particle diameter of 140 nm was obtained in the same manner as in the method for producing a multi-layered particle (B-4), except that the amount of sodium polyoxyethylene tridecyl ether acetate was changed to 0.055 part by mass. Properties of the multi-layered particle (B-6) are collectively shown in Table 1.

[Production of Particle for Dispersion (C-1)]

In a reactor equipped with a stirrer, a thermometer, a nitrogen gas introducing tube, a monomer introducing tube, and a reflux condenser, 150 parts by mass of deionized water, 0.12 part by mass of sodium polyoxyethylene tridecyl ether acetate, and 0.1 part by mass of sodium carbonate were charged and the atmosphere in the container was sufficiently purged with a nitrogen gas, leading to a substantially oxygen-free state, and then the inner temperature was set at 80° C. In the container, 0.01 part by mass of potassium persulfate was charged, followed by stirring for 5 minutes. Thereafter, 100 parts by mass of a mixture of methyl methacrylate, methyl acrylate and n-octyl mercaptan at a mass ratio of 94.0/6.0/0.3 was continuously added dropwise over 60 minutes. After completion of the dropwise addition, the reaction was performed for about 30 minutes until the polymerization ratio reached not less than 98% to obtain a latex containing a single-layer particle for dispersion (C-1) having a volume average particle diameter of 90 nm, which is composed of a non-crosslinked polymer having a weight average molecular weight (Mw) of 80,000 g/mol. Properties of the particle for dispersion (C-1) are collectively shown in Table 1.

[Production of Methacrylic Resin (A-1)]

A mixture of 94% by mass of methyl methacrylate and 6% by mass of methyl acrylate was reacted by a suspension polymerization method. The suspended particle was coagulated, dehydrated, and then dried to obtain a methacrylic resin (A-1) having a weight average molecular weight (Mw) of 160,000 g/mol as measured by GPC.

TABLE 1

|  | Multi-layered particle | | | | | | Particle for dispersion |
| --- | --- | --- | --- | --- | --- | --- | --- |
|  | B-1 | B-2 | B-3 | B-4 | B-5 | B-6 | C-1 |
| Layer (a) | 10 | 12 | 35 | 10 | 0 | 10 | 0 |
| Methyl methacrylate [Parts by mass] | 93.9 | 93.9 | 94.0 | 93.9 | — | 93.9 | — |
| Methyl acrylate [Parts by mass] | 6.1 | 6.1 | — | 6.1 | — | 6.1 | — |
| Allyl methacrylate [Parts by mass] | 0.2 | 0.2 | 0.2 | 0.2 | — | 0.2 | — |
| n-Butyl acrylate [Parts by mass] | — | — | 6.0 | — | — | — | — |
| n-Octyl mercaptan [Parts by mass] | — | — | 0.1 | — | — | — | — |
| Layer (b) | 50 | 53 | 45 | 50 | 50 | 50 | 0 |
| n-Butyl acrylate [Parts by mass] | 82.2 | 82.2 | 82.2 | 82.2 | 82.2 | 82.2 | — |
| Styrene [Parts by mass] | 17.8 | 17.8 | 17.8 | 17.8 | 17.8 | 17.8 | — |
| Allyl methacrylate [Parts by mass] | 4.0 | 4.0 | 2.0 | 4.0 | 4.0 | 4.0 | — |
| Layer (c) | 40 | 38 | 20 | 40 | 50 | 40 | 100 |
| Methyl methacrylate [Parts by mass] | 94.0 | 94.0 | 94.0 | 94.0 | 94.0 | 94.0 | 94.0 |
| Methyl acrylate [Parts by mass] | 6.0 | 6.0 | 6.0 | 6.0 | 6.0 | 6.0 | 6.0 |
| n-Octyl mercaptan [Parts by mass] | 0.3 | 0.3 | 0.2 | 0.3 | 0.3 | 0.3 | 0.3 |
| Layer mass ratio (a)/(b)/(c) | 10/50/40 | 12/53/38 | 35/45/20 | 10/50/40 | 0/50/50 | 10/50/40 | 0/0/100 |
| Volume average particle diameter [nm] | 110 | 100 | 145 | 220 | 110 | 140 | 90 |

Example 1

A latex containing 60 parts by mass of the multi-layered particle (B-1) was mixed with a latex containing 40 parts by mass of the particle for dispersion (C-1). The resulting mixed latex was frozen at −30° C. over 4 hours. The frozen product was charged in a two-fold amount of water at 90° C. and dissolved to obtain a slurry. The slurry was maintained at 90° C. for 20 minutes and then dehydrated. The obtained solid component was dried at 80° C. to obtain resin powder (b1) having a bulk specific gravity of 0.52 g/cm$^3$. The resin powder (b1) was formed at 250° C. using a single-screw extruder with a 40φ vent into a pelletized resin composition (1). The resin composition (1) was injection-molded and the Vicat softening temperature (VST1) of the obtained molded body (1) was measured. The results are shown in Table 2.

Using a super mixer, 100 parts by mass of the resin powder (b1) was mixed with 200 parts by mass of the methacrylic resin (A-1). The obtained compound was formed at 240° C. using a single-screw extruder with a 40φ vent into a pelletized resin composition (2).

The resin composition (2) was injection-molded, and the Vicat softening temperature (VST2) of the obtained molded body (2) was measured. The results are shown in Table 2.

Evaluation tests of resistance to whitening upon bending, pencil hardness, and coextrusion formability of the resin composition (2) were performed. The results are shown in Table 2.

Example 2

The evaluation tests were performed in the same manner as in Example 1, except that the latex containing the multi-layered particle (B-1) was changed to the latex containing the multi-layered particle (B-2). The results are shown in Table 2.

Example 3

The evaluation tests were performed in the same manner as in Example 1, except that the latex containing the multi-layered particle (B-1) was changed to the latex containing the multi-layered particle (B-6). The results are shown in Table 2.

Comparative Example 1

The evaluation tests were performed in the same manner as in Example 1, except that the latex containing the multi-layered particle (B-1) was changed to the latex containing the multi-layered particle (B-3). The results are shown in Table 2.

Comparative Example 2

The evaluation tests were performed in the same manner as in Example 1, except that the latex containing multi-layered particles (B-1) was changed to the latex containing multi-layered particles (B-4). The results are shown in Table 2.

Comparative Example 3

The evaluation tests were performed in the same manner as in Example 1, except that the latex containing multi-layered particles (B-1) was changed to the latex containing multi-layered particles (B-5). The results are shown in Table 2.

TABLE 2

| | Example | | | Comparative Example | | |
|---|---|---|---|---|---|---|
| | 1 | 2 | 3 | 1 | 2 | 3 |
| Multi-layered particle [Parts by mass] | | | | | | |
| B-1 | 60 | | | | | |
| B-2 | | 60 | | | | |
| B-3 | | | | 60 | | |
| B-4 | | | | | 60 | |
| B-5 | | | | | | 60 |
| B-6 | | | 60 | | | |
| Particle for dispersion [Parts by mass] | | | | | | |
| C-1 | 40 | 40 | 40 | 40 | 40 | 40 |
| Resin [Parts by mass] | | | | | | |
| A-1 | 200 | 200 | 200 | 200 | 200 | 200 |
| Heat resistance | | | | | | |
| VST1 [° C.] | 94 | 93 | 92 | 85 | 90 | 83 |
| VST2 [° C.] | 101 | 100 | 101 | 97 | 101 | 95 |
| Resistance to whitening upon bending | ○ | ○ | ○ | ○ | × | ○ |
| Pencil hardness | 3H | 3H | 3H | 2H | H | H |
| Coextrusion formability | ○ | ○ | ○ | ○ | ○ | ○ |

*VST1: Vicat softening temperature of a molded body (1) obtained from a composition (1) comprising a mixed powder composed of a multi-layered particle and a particle for dispersion C-1
*VST2: Vicat softening temperature of a molded body (2) obtained from a composition (2) comprising a mixed powder composed of a multi-layered particle and a particle for dispersion C-1, and a resin A-1

The invention claimed is:

1. A resin film comprising
a multi-layered particle (B) comprising a layer (a) made of a polymer comprising 80 to 99.99% by mass of a methyl methacrylate unit, 0.01 to 2% by mass of a crosslinkable monomer unit and 0 to 19.99% by mass of an alkyl acrylate unit, said methyl methacrylate unit, crosslinkable monomer unit and alkyl acrylate unit totaling 100% by mass of the polymer,
a layer (b) made of a polymer comprising 70 to 99.8% by mass of an alkyl acrylate unit, 0.2 to 10% by mass of a crosslinkable monomer unit and 0 to 29.8% by mass of additional copolymerizable monomer units, and
a layer (c) made of a polymer comprising 80 to 100% by mass of a methyl methacrylate unit and 0 to 20% by mass of additional copolymerizable monomer units,
wherein an amount of the layer (a) is 5 to 15 parts by mass, an amount of the layer (b) is 40 to 60 parts by mass, and an amount of the layer (c) is 35 to 50 parts by mass, based on 100 parts by mass of the total amount of the layer (a), the layer (b) and the layer (c), and
the layer (a), the layer (b) and the layer (c) are arranged in this order from the center of the particle toward the outer surface of the particle, and
a volume-based average particle diameter is 90 to 150 nm; and
a resin (A), wherein the resin (A) is a methacrylic resin (a1) comprising 80 to 100% by mass of a methyl methacrylate unit and 0 to 20% by mass of an alkyl acrylate unit, said methyl methacrylate unit and alkyl acrylate unit totaling 100% by mass of the methacrylic resin (a1).

2. The resin film according to claim 1, wherein the methacrylic resin (a1) has a weight average molecular weight as measured by gel permeation chromatography of not less than 90,000 g/mol.

3. The resin film according to claim 1, further comprising a polymer (C) which comprises 80 to 100% by mass of a methyl methacrylate unit and has a weight average molecular weight as measured by gel permeation chromatography of less than 90,000 g/mol at a mass ratio (C/B) of the polymer (C) to the multi-layered particle (B) of 20/80 to 55/45.

4. The resin film according to claim 1, wherein a mass ratio (B/A) of the multi-layered particle (B) to the resin (A) is 1/99 to 99/1.

5. A laminate comprising a layer composed of the resin film according to claim 1.

6. A method for producing a resin film, comprising:
polymerizing a monomer mixture comprising 80 to 99.99% by mass of methyl methacrylate, 0.01 to 2% by mass of a crosslinkable monomer and 0 to 19.99% by mass of an alkyl acrylate to form a layer (a), said methyl methacrylate, crosslinkable monomer and alkyl acrylate totaling 100% by mass of the monomer mixture,
polymerizing a monomer mixture comprising 70 to 99.8% by mass of an alkyl acrylate, 0.2 to 10% by mass of a crosslinkable monomer and 0 to 29.8% by mass of additional copolymerizable monomers to form a layer (b), and
polymerizing a monomer mixture comprising 80 to 100% by mass of methyl methacrylate and 0 to 20% by mass of additional copolymerizable monomers to form a layer (c), in this order, to produce a multi-layered particle (B) wherein an amount of the layer (a) is 5 to 15 parts by mass, an amount of the layer (b) is 40 to 60 parts by mass and an amount of the layer (c) is 35 to 50 parts by mass, based on 100 parts by mass of the total amount of the layer (a), the layer (b) and the layer (c), and a volume-based average particle diameter is 90 to 150 nm;
kneading a mixture comprising at least the multi-layered particle (B) and a resin (A), wherein the resin (A) is a methacrylic resin (a1) comprising 80 to 100% by mass of a methyl methacrylate unit and 0 to 20% by mass of is an alkyl acrylate unit, said methyl methacrylate unit and alkyl acrylate unit totaling 100% by mass of the methacrylic resin (a1); and
forming the kneaded mixture into a film.

7. The method according to claim 6, wherein the methacrylic resin (a1) has a weight average molecular weight as measured by gel permeation chromatography of not less than 90,000 g/mol.

8. The method according to claim 6, wherein the mixture used in the kneading further comprises a polymer (C) comprising 80 to 100% by mass of a methyl methacrylate unit and having a weight average molecular weight as measured by gel permeation chromatography of less than 90,000 g/mol at a mass ratio (C/B) of the polymer (C) to the multi-layered particle (B) of 20/80 to 55/45.

9. The method according to claim 6, wherein a mass ratio (B/A) of the multi-layered particle (B) to the resin (A) is 1/99 to 99/1.

10. The method according to claim 6, further comprising mixing the multi-layered particle (B) with a particle for dispersion composed of a polymer (C) to obtain a mixed powder, and compounding the mixed powder with the resin (A) to obtain the mixture to be used in the kneading, wherein the polymer (C) comprises 80 to 100% by mass of a methyl methacrylate unit.

11. A method for producing a resin film, which comprises kneading a mixture comprising at least a multi-layered particle (B) and a resin (A), wherein the resin (A) is a methacrylic resin (a1) comprising 80 to 100% by mass of a methyl methacrylate unit and 0 to 20% by mass of an alkyl acrylate unit, said methyl methacrylate unit and alkyl acrylate unit totaling 100% by mass of the methacrylic resin (a1); and
forming the kneaded mixture into a film;
wherein the multi-layered particle (B) is obtained by a process comprising:
polymerizing a monomer mixture comprising 80 to 99.99% by mass of methyl methacrylate, 0.01 to 2% by mass of a crosslinkable monomer and 0 to 19.99% by mass of an alkyl acrylate to form a layer (a), said methyl methacrylate, crosslinkable monomer and alkyl acrylate totaling 100% by mass of the monomer mixture,
polymerizing a monomer mixture comprising 70 to 99.8% by mass of an alkyl acrylate, 0.2 to 10% by mass of a crosslinkable monomer and 0 to 29.8% by mass of other copolymerizable monomers to form a layer (b), and
polymerizing a monomer mixture comprising 80 to 100% by mass of methyl methacrylate and 0 to 20% by mass of other copolymerizable monomers to form a layer (c), in this order,
wherein an amount of the layer (a) is 5 to 15 parts by mass, an amount of the layer (b) is 40 to 60 parts by mass and an amount of the layer (c) is 35 to 50 parts by mass, based on 100 parts by mass of the total amount of the layer (a), the layer (b) and the layer (c), and a volume-based average particle diameter of the multi-layered particle (B) is 90 to 150 nm.

* * * * *